Nov. 21, 1933.  E. G. HALLQUIST  1,936,389
SPRING DEVICE
Filed July 11, 1932  4 Sheets-Sheet 1
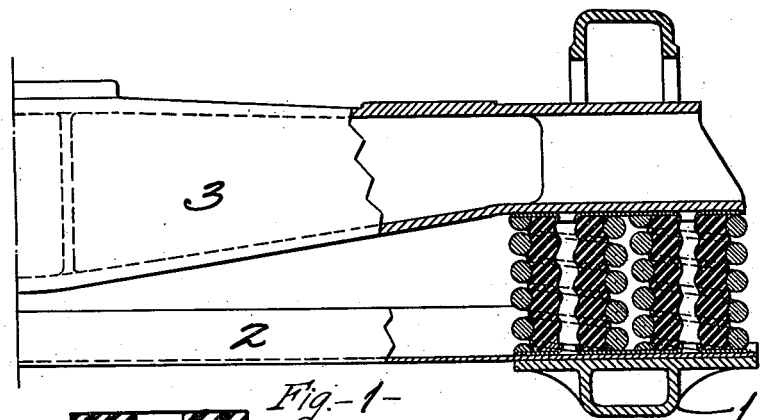
Fig.-1-
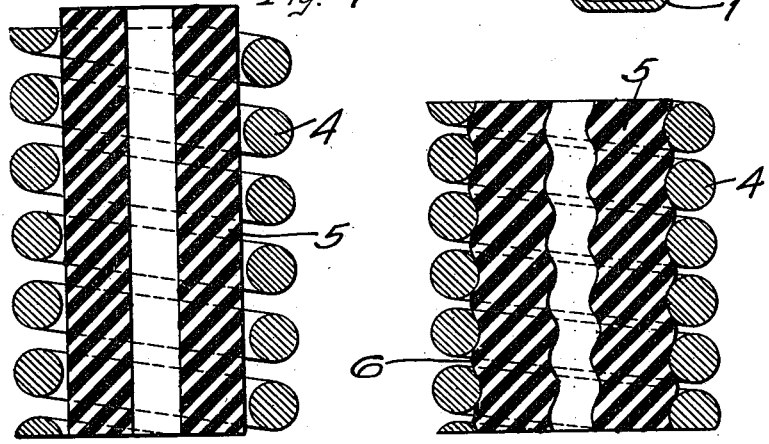
Fig.-2-  Fig.-3-
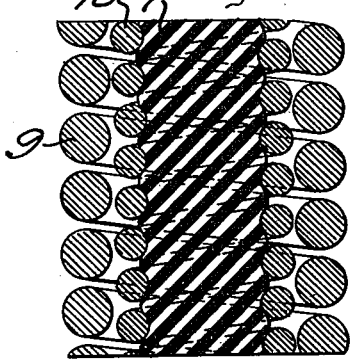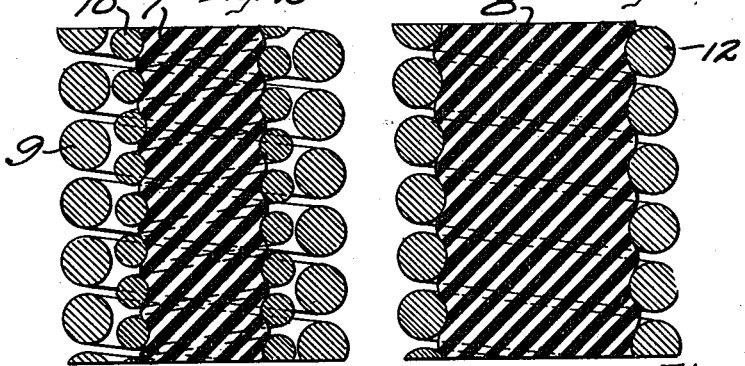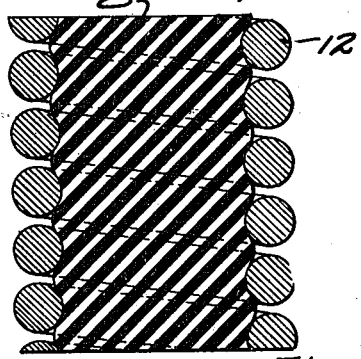
Fig.-4-  Fig.-5-
Inventor
Einar G. Hallquist
BY Rodney Bedell
Attorney

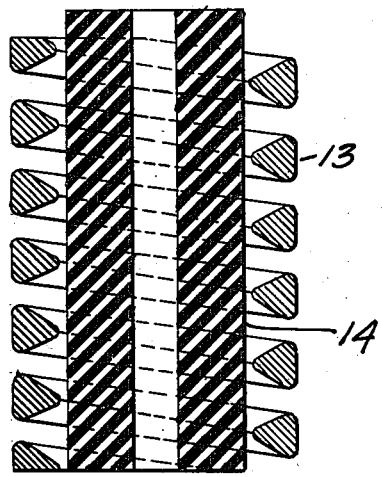
Fig.-6-
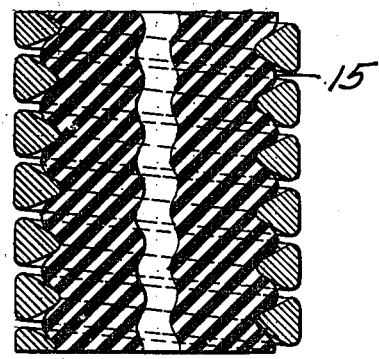
Fig.-7-
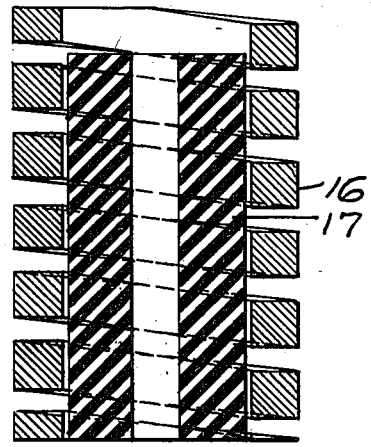
Fig.-8-
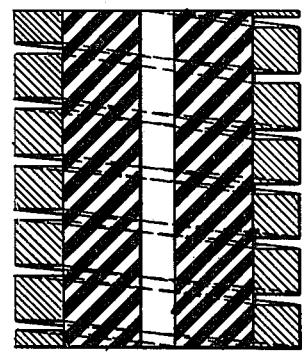
Fig.-9-
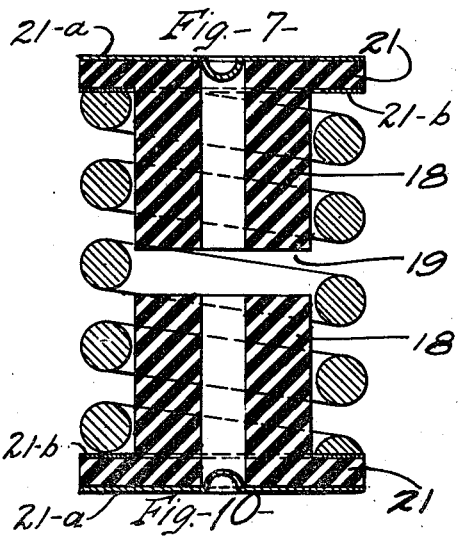
Fig.-10-
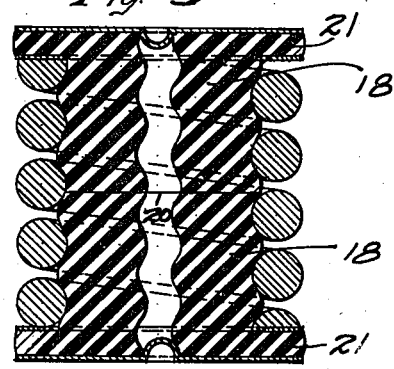
Fig.-11-
Inventor
Einar G. Hallquist
By Rodney Bedell
Attorney

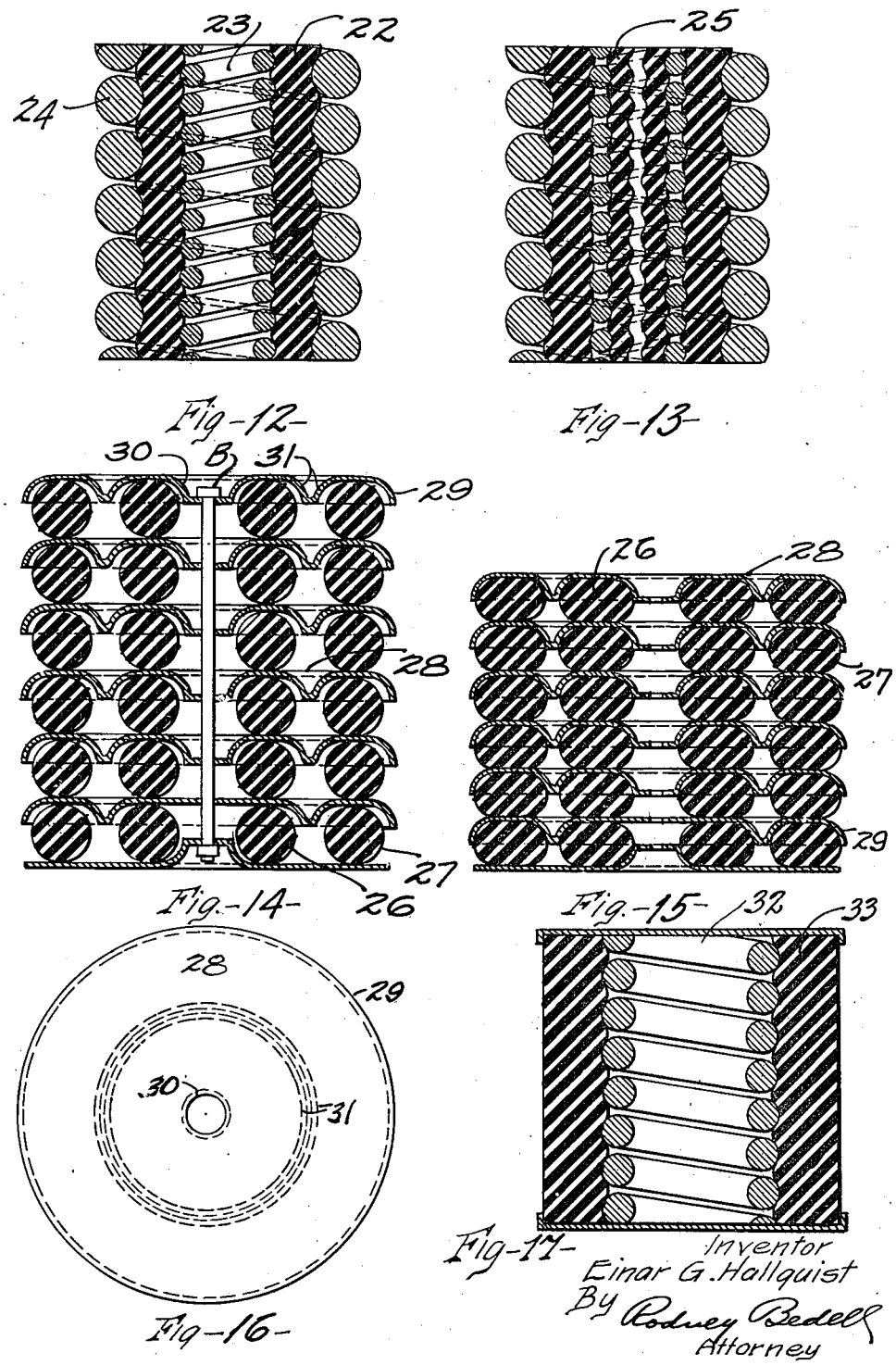

Nov. 21, 1933.   E. G. HALLQUIST   1,936,389
SPRING DEVICE
Filed July 11, 1932   4 Sheets-Sheet 4
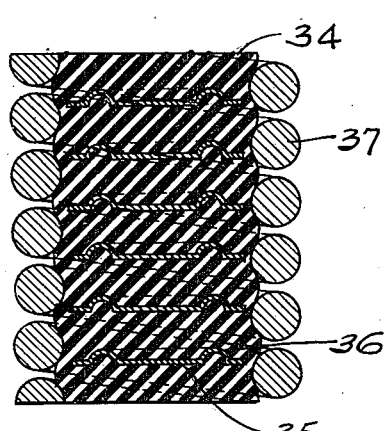
Fig-18-
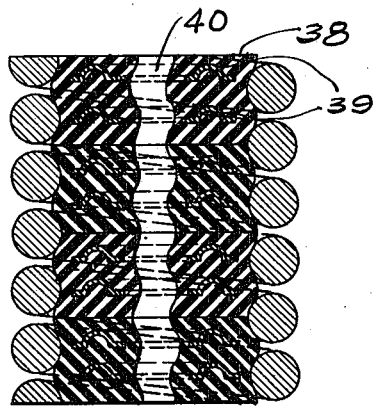
Fig-19-
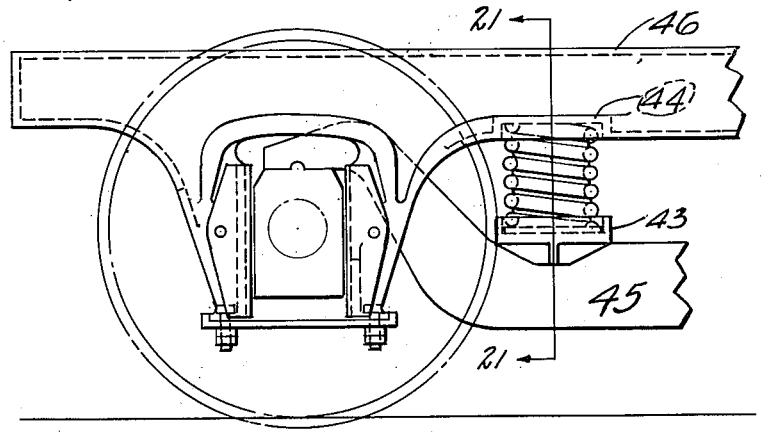
Fig-20-
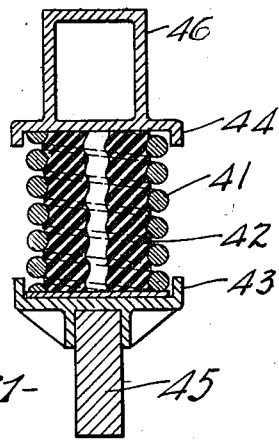
Fig-21-
Inventor
Einar G. Hallquist
By Rodney Bedell
Attorney Patented Nov. 21, 1933

1,936,389

UNITED STATES PATENT OFFICE

1,936,389

SPRING DEVICE

Einar G. Hallquist, Edwardsville, Ill., assignor to General Steel Castings Corporation, Granite City, Ill., a corporation of Delaware Application July 11, 1932. Serial No. 621,793

1 Claim. (Cl. 267—63)

The invention relates to spring structure and particularly to springs to which a heavy load is applied, and the invention consists in a combination of metal and non-metallic resilient elements cooperating to utilize the characteristics of each element and to avoid some of the disadvantages resulting from use of one element alone due to the synchronization of vibrating motions.

One object of the invention is to utilize the cushioning value of a block of non-metallic elastic material, such as rubber, synthetic rubber, cork, or a composition of such or similar materials, without imposing a maximum load upon the block at all times which tends to deaden the same.

Another object is to dampen the vibrations of the metal elements and to avoid the oscillations frequently accompanying the use of coiled springs of steel and the resulting jolting of the structure supported by the springs.

Another object is to use an elastic element of rubber or like material in combination with other elements which are capable of carrying greater loads in places of restricted clearance where the elastic element alone would not have sufficient capacity.

The spring shown in the accompanying drawings has been constructed especially for use in railway rolling stock and—

Figure 1 is a section through a portion of a car truck.

Figure 2 is a detail of one of the spring devices shown in Figure 1 before it is applied to the truck.

Figure 3 is a corresponding detail of the compressed spring device.

Figure 4 illustrates a modified structure of a spring device which is shown under load.

Figure 5 details another spring device under load.

Figures 6 and 7 illustrate another modification when free and when loaded, respectively.

Figures 8 and 9 similarly illustrate another modification.

Figures 10 and 11 similarly illustrate still another modification.

Figures 12 and 13 respectively illustrate each of two other modifications.

Figures 14, 15 and 16 illustrate another modification, Figure 16 being a top view of the spring shown in Figures 14 and 15 when loaded.

Figure 17 illustrates still another modification.

Figures 18 and 19, respectively, illustrate the application of reinforcing plates molded within the core.

Figures 20 and 21 illustrate the side elevation of an equalized truck and a cross section through the equalizer spring.

Referring to Figures 1, 2 and 3, the truck side frame 1 is shown in cross section and carries the usual spring plank 2 on which a plurality of the spring devices are mounted and support in turn the truck bolster 3. Each spring device comprises a helix 4 of metal and a core 5 of rubber or other elastic material preferably in the form of a hollow cylinder slightly smaller in outside diameter normally than the inside diameter of the metal coil and preferably of greater free height than the coil.

When placed in service the core will first be compressed to receive the load and as the load on both core and coil is increased the core will expand in diameter more rapidly than the metal spring, whereupon the side of the core will frictionally contact with the inner faces of the metal coils and restrain their movement. As the load is further increased the material of the core will flow into the crevices between successive coils, as indicated at 6, and the core, in addition to supporting a fair share of the load, will act as a snubber to dampen the vibrations and oscillations which might otherwise result from the use of the steel spring alone.

As the total travel of springs for this type of service from normal load height to solid height is generally small in proportion to their length, there will be little relative movement of the metal and core along each other and the extruded portions of the core and the metal coils will have a tendency to grip each other and move in unison.

By providing the core with a hollow center, it is better adapted to be deflected away from the steel bar where necessary to facilitate the operation of the device and by varying the size of the hole through the core the resistance of the spring under any load may be varied.

However, the opening through the core may be omitted and Figures 4 and 5 illustrate the use of solid cores 7 and 8, respectively. In Figure 4 the spring device includes two metal helices 9 and 10 and the inner helix is filled with the solid core 7 leaving the outer helix 9 to operate as in ordinary springs. Figure 5 illustrates a large single helix 12 with its interior substantially filled with the solid core 8.

Figures 6 and 7 illustrate a modification having an outer steel helix 13 made from a bar of substantially triangular cross section bent in such manner that one of the flat sides of the bar forms the outer surface of the spring while the other two sides of the bar converge inwardly. This provides greater space between the coils of the helix and as the device is compressed there is more room into which the core 14 may flow, as indicated at 15, and there will be a more secure grip effected between the core and steel. The core will form a substantial cushion between successive coils of the helix.

Figures 8 and 9 illustrate a modification varying from the first construction in the opposite manner from the modification of Figures 6 and 7. Here the helix 16 is formed of a square bar having a flat side facing inwardly towards the core 17. When the load compresses and expands the core 17 until it engages the inner face of the helix, the friction alone between the smooth interengaging surfaces of the two parts will be relied upon to dampen the vibrations.

In Figures 10 and 11, the core 18 is in the form of a spool formed in two halves which may be spaced apart, as indicated at 19 in Figure 10, when the device is unloaded but abut each other, as indicated at 20, when the device is loaded. Each part has a flange 21 overlying and seating an end of the helix. It has been proposed heretofore to utilize rubber washers or seats for metal springs and the present modification utilizes this feature in addition to the core cooperating with the metal spring to carry the load and deaden the vibrations of the metal spring. To reinforce and protect the core, metal plates 21a and 21b may be bonded to the rubber washers or seats.

In Figure 12, the core 22 is placed between inner and outer metal helices 23 and 24 and is compressed between these metal parts when the device is in service and serves to dampen the vibrations of each metal helix: first, because of its own resistance to the movement thereof; and second, by tying the movement of each metal element to the other metal element. In Figure 13, a similar arrangement is shown which contains in addition an inner core 25 contacting with the inner spring only.

The structure shown in Figures 14, 15 and 16 utilizes a plurality of coils or rings 26 and 27 of non-metallic elastic material placed one above the other, but the successive coils are separated by the metal plates 28 which have cup-like elements 29, 30 and 31 serving to resist the expansion of the coils or rings under load, as indicated in Figure 15. A bolt B fastened through the center of the device clamps all the parts together so that they may be handled as a unit in manufacture, installation and removal.

Figure 17 illustrates a form of the device in which a metal helix 32 is surrounded by a cylinder 33 of sufficient thickness to support a part of the load and also serving to grip and be gripped by the coils of the helix and thereby to function as the cores referred to above. This form is especially adapted to be used as a tension spring.

In Figure 18, the core 34 is reinforced by a plurality of metal plates 35 extending transversely of the spring device and preferably each plate includes a corrugation 36 whereby the plate is maintained in its position in the core. This arrangement will tend to rigidify the core somewhat and to increase its thrust against the inner faces of the metal coil 37.

Figure 19 illustrates a similar arrangement in which the core is made up of a plurality of blocks 38 each having a pair of reinforcing plates 39. The blocks are superimposed upon each other and are provided with a hollow central portion 40. With this arrangement the cores may be built up for different heights of springs and one or more core blocks may be replaced, if desired.

Figures 20 and 21 show the invention applied to a passanger car truck in which the spring device comprises a helix 41 and a core 42, similar to that shown in Figures 2 and 3, compressed between spring seats 43 and 44 provided on the equalizer bar 45 and in the truck frame wheel piece 46, respectively.

The devices illustrated are proportioned for service in a car truck, as illustrated in Figures 1, 20 and 21, but the devices may be used elsewhere in railway rolling stock construction, as for instance, in draft gears and buffer devices. Similar spring devices may be designed for a variety of uses other than railway rolling stock.

A tension spring may embody some of the constructions described, particularly that of Figures 12, 13 and 17, and in the accompanying claim the term "distortion" is intended to cover both tension and compression springs as well as any other type of spring in which the distorted metal tends to set up undesirable vibrations and in which a mere rubber or like member is not sufficiently long-lived to be effective. The exclusive use of modifications other than those herein illustrated but coming within the scope of the claim is contemplated.

What is claimed is:

A spring device comprising a series of relatively thick coils of non-metallic elastic material disposed one above the other, a series of relatively thin sheet metal plates associated with said coils and having elements disposed to limit lateral movement of the material of said coils when under a load.

EINAR G. HALLQUIST.